United States Patent
Rouleau

(10) Patent No.: US 7,643,433 B2
(45) Date of Patent: Jan. 5, 2010

(54) AUTOMATIC LOCAL LAPB DEVICE CONFIGURATION METHOD AND APPARATUS

(75) Inventor: Gordon Rouleau, Rosemère (CA)

(73) Assignee: Dialogic Corporation, Montreal, Quebec (CA)

( * ) Notice: Subject to any disclaimer, the term of this patent is extended or adjusted under 35 U.S.C. 154(b) by 872 days.

(21) Appl. No.: 10/788,479

(22) Filed: Mar. 1, 2004

(65) Prior Publication Data

US 2005/0190751 A1  Sep. 1, 2005

(51) Int. Cl.
*H04L 12/28* (2006.01)
(52) U.S. Cl. .................................... 370/254
(58) Field of Classification Search ............. 370/255, 370/357, 392, 464, 254, 257; 709/713
See application file for complete search history.

(56) References Cited

U.S. PATENT DOCUMENTS

| | | | | |
|---|---|---|---|---|
| 4,975,910 A | * | 12/1990 | Onder | 370/466 |
| 5,708,778 A | * | 1/1998 | Monot | 709/228 |
| 6,885,978 B2 | * | 4/2005 | Chu et al. | 702/186 |

FOREIGN PATENT DOCUMENTS

EP  0806855 A2  12/1997

OTHER PUBLICATIONS

"Integrated Services Digital Network (ISDN); International digital audiographic teleconference; I-ETS 300 101" ETSI Standards, European Telecommunications Standards Institute, Sophia-Antipo, FR, vol. TE-10, Feb. 1993, pp. 146-149.
"Information Processing Systems—Data Communication—High-Level Data Link Control Procedures—Description of The X.25 LAPB-Compatible DTE Data Link Procedures Systemes de Traitement de L'Information—Communication de Donnees—Procedures de Commande" International Standard—ISO, Zuerich, CH, No. 7776, Dec. 15, 1986, pp. 6-16.
European Search Report from co-pending European Application No. 05003567.4, dated Nov. 30, 2007.

* cited by examiner

*Primary Examiner*—Chirag G Shah
*Assistant Examiner*—Yong Zhou
(74) *Attorney, Agent, or Firm*—Weingarten, Schurgin, Gagnebin & Lebovici LLP

(57) ABSTRACT

A method and apparatus is disclosed for configuring a local LAPB device in accordance with a remote LAPB device using a received frame provided by the remote LAPB device.

15 Claims, 4 Drawing Sheets

AUTOMATIC LOCAL LAPB DEVICE CONFIGURATION METHOD AND APPARATUS

CROSS-REFERENCE TO RELATED APPLICATIONS

This is the first application filed for the present invention.

TECHNICAL FIELD

This invention relates to the field of telecommunications. More precisely, this invention pertains to the field of data communication networks.

BACKGROUND OF THE INVENTION

X.25 is the. International Telecommunications Union's recommendation for an interface between a Data Terminal Equipment (DTE) and Data Computing Equipment (DCE) over a Public Data Network. Generally, X.25 covers layers 1 to 3 of the ISO communication model. X.25 is most often carried within LAPB Information (I) frames, which are in turn transported by HDLC physical media operating in asynchronous balanced mode (ABM).

Link Access Protocol Balanced (LAPB) is a layer 2 protocol and is used to carry X.25 packets. In fact, as known by the skilled addressee, the link layer ensures reliable transfer of data by transmitting the data as a sequence of frames. Furthermore, the link layer is used for connection synchronization of the layer 1 physical media in order to ensure that a receiver is in step with a transmitter.

The link layer protocol is further adapted to detect transmission of errors and recovery from such errors as well as identification and reporting of procedural errors to higher layers for recovery.

Now referring to FIG. 1, there is shown how a local LAPB device is configured according to prior art method.

According to step 10, data related to a remote LAPB device to which a local LAPB will be connected is gathered by an operator. The data comprises operating and addressing mode (DTE or DCE), startup mode (active or passive, with or without remote resets), and frame format (modulo-8 or "basic" mode, modulo-128 or "extended" mode, modulo-32768 or "super" mode).

According to step 12, the local LAPB device is configured by the operator. More precisely, the local LAPB device is configured according to the data related to the remote LAPB device configuration gathered according to step 10. The local LAPB device may be configured by the operator as a data computing equipment or as a data terminal equipment. As known by the one skilled in the art, the configuration is performed via a configuration interface.

It will be appreciated that such configuration requires knowledgeable human resources, which is costly.

Moreover, it will be appreciated that such configuration requires the operator to gather information on the remote LAPB device which may be a source of errors as the network may comprise a large number of devices which may render the task cumbersome.

There is a need for a method and apparatus that will overcome the above-identified drawbacks.

SUMMARY OF THE INVENTION

It is an object of the invention to provide a method for automating the configuration of a local LAPB device in accordance with a configuration of a remote LAPB device.

Yet another object of the invention is to provide an apparatus for configuring a local LAPB device in accordance with a configuration of a remote LAPB device.

According to a first aspect of the invention, there is provided a method for configuring a local LAPB device in accordance with a configuration of a remote LAPB device, the method comprising providing a received frame from the remote LAPB device, when the received frame indicates that the remote LAPB device comprises a data terminal equipment (DTE), configuring the local LAPB device as a data computing equipment (DCE) and when the received frame indicates that the remote LAPB device comprises a data computing equipment, configuring the local LAPB device as a data terminal equipment.

According to another aspect of the invention, there is provided an apparatus for configuring a local LAPB device in accordance with a configuration of a remote LAPB device, the apparatus comprising a communication port receiving a layer 1 data signal originating from the remote LAPB device and providing at least one part of the data signal, a memory storing data identifying at least one of a data computing equipment and a data terminal equipment and a processing unit receiving the at least one part of the data signal, checking whether the at least one part of the data signal is indicative of one of a data computing equipment (DCE) and a data terminal equipment (DTE) using the data stored in the memory and providing a configuration signal to the local LAPB device and wherein the configuration signal will configure the local LAPB device as a data computing equipment (DCE) in the case where the at least one part of the data signal is indicative of a data terminal equipment and further wherein the configuration signal will configure the local LAPB device as a data terminal equipment in the case where the at least one part of the data signal is indicative of a data computing equipment.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
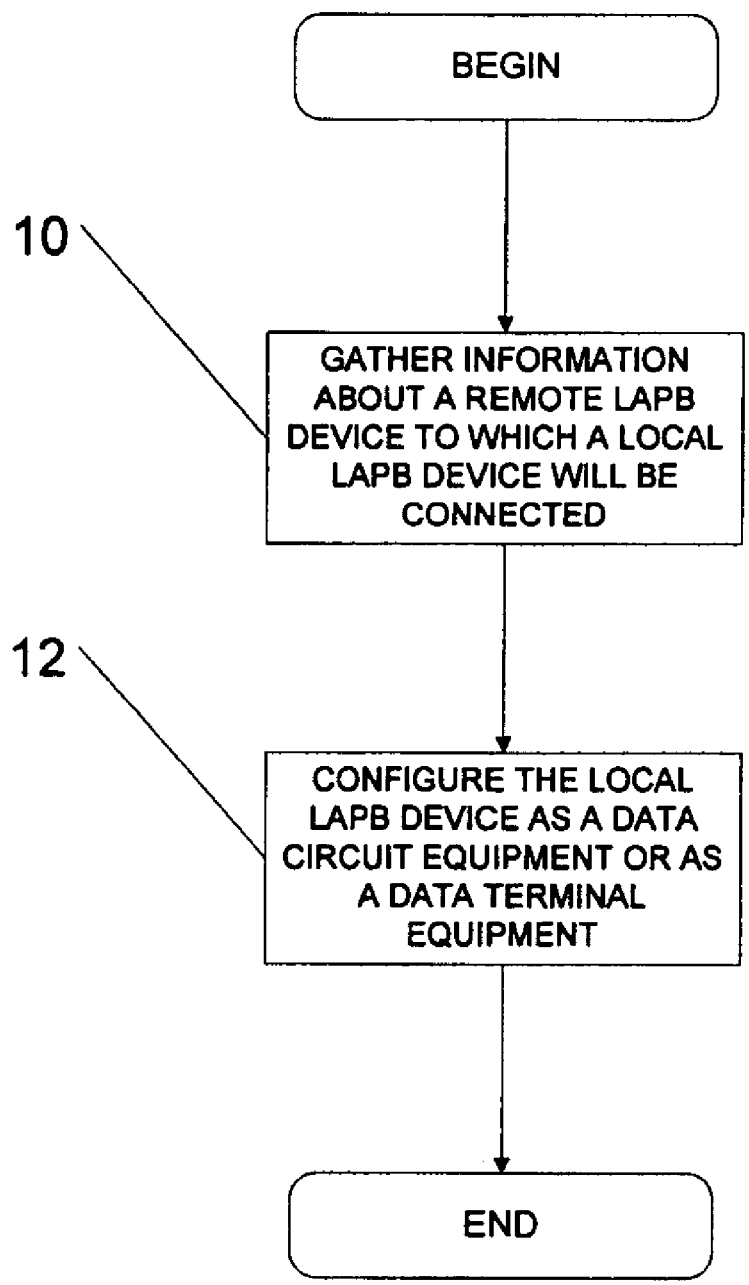
FIG. 1 is a flowchart which shows how a local LAPB device is configured, according to a prior art method.
Figure 4:
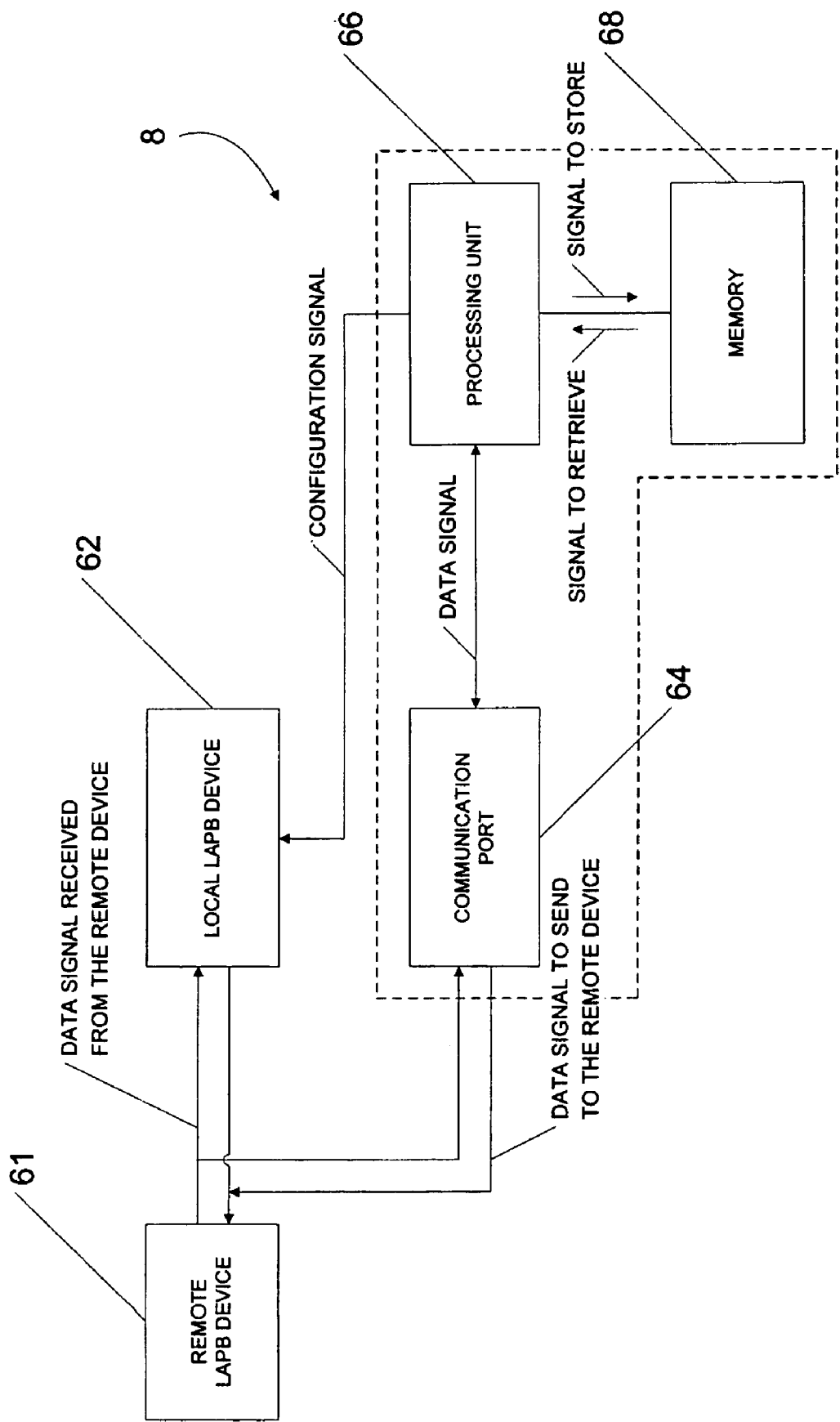
FIG. 4 is a block diagram which shows an embodiment of a local LAPB device configuration apparatus.

Now referring to FIG. 4, there is shown a block diagram which shows a remote LAPB device 61 connected to a local LAPB device 62 to be configured using a local LAPB device configuration apparatus 8. At this point it should be understood by the skilled addressee that while such embodiment shows the local LAPB device configuration apparatus 8 as being a separate device with its own layer 1 port in FIG. 1, it should be understood that alternatively, the local LAPB device configuration apparatus 8 may be implemented as a part of the local LAPB device 62 and that in such case, the local LAPB device configuration apparatus 8 would make use of the layer 1 port of the local LAPB device 62.

More precisely, the local LAPB device configuration apparatus 8 comprises a communication port 64, a processing unit 66 and a memory 68.

The communication port 64 is adapted to receive a data signal provided by the remote LAPB device 61 to the local LAPB device 62.

The communication port 64 is further adapted to send a data signal to the remote LAPB device 61.

The processing unit 66 is adapted to process a data signal received from the communication port 64.

The processing unit 66 is further adapted to provide a configuration signal to the local LAPB device 62.

The processing unit 66 is further adapted to store/retrieve a signal in the memory 68.

The memory 68 is adapted to store a signal which is disclosed below.

Figure 2:
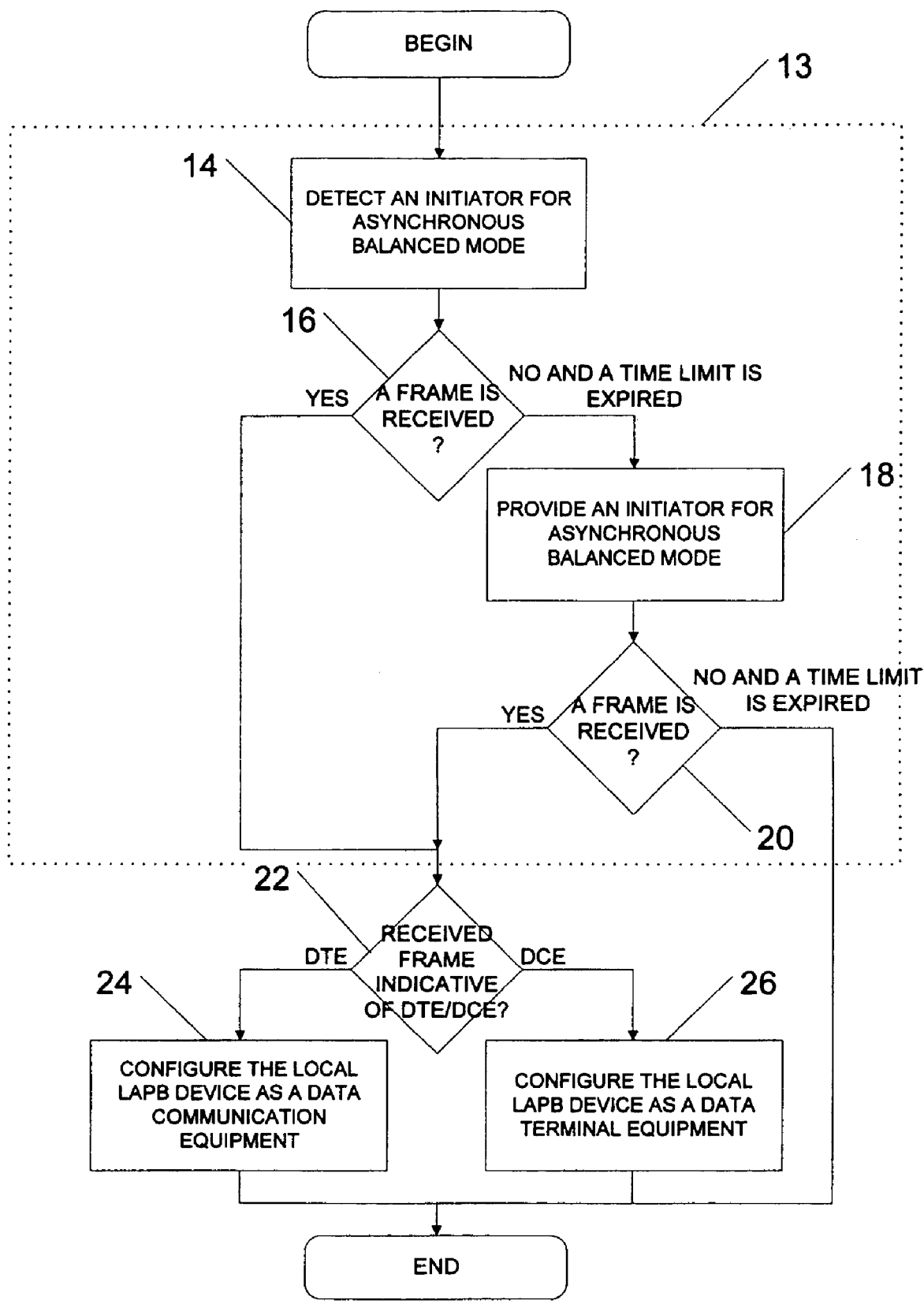
FIG. 2 is a flowchart which shows how a local LAPB device is configured according to a preferred embodiment of the invention.

Now referring to FIG. 2, there is shown how the local LAPB device 62 is configured according to a preferred embodiment of the invention using the local LAPB device configuration apparatus 8.

According to step 13, a frame received from the remote LAPB device 61 is provided to the local LAPB device configuration apparatus 8.

More precisely, according to step 14, an initiator for asynchronous balanced mode is detected by the local LAPB device configuration apparatus 8. In a preferred embodiment, the initiator for asynchronous balanced mode is detected by providing a received signal, originating from the remote LAPB device 61, to the communication port 64 and testing the provided signal using the processing unit 66 and the memory 68. The initiator is detected as either one a LAPB SABM, SABME, and SM supervisory frame either in basic, extended or super mode frame format. The received frame may be any one of these listed types, all of which serve to solicit LAPB to either establish a connection or to confirm it is available for a connection. The DISC or DM supervisory frames for requesting or confirming the remote LAPB device is disconnected and the LAPB FRMR for error reporting from the remote LAPB device 61 may also be used to confirm the frame format expected by the remote LAPB device 61.

According to step 16, a test is performed by the processing unit 66 in order to find out if an initiator for asynchronous balanced mode is received by the local LAP8 device 62 at the communication port 64 and a time limit is expired. It will be appreciated by the skilled addressee that a predetermined amount of time is allocated by the processing unit 66 for detecting the initiator for asynchronous balanced mode frame. It will be appreciated that the amount of time required is variable but typically about 30 seconds, depending on configuration parameters.

The detection of an initiator for asynchronous balanced mode is performed until the above-mentioned time limit is expired.

According to step 18, in the case where no frame is received and the time limit is expired, an initiator for asynchronous balanced mode is provided by the local LAPB device configuration apparatus 8 to the remote LAPB device 61. The initiator for asynchronous balanced mode is generated by the processing unit 66, provided to the communication port 64 of the local LAPB device configuration apparatus 8 and transmitted to the remote LAPB device 61.

According to step 20, a test is performed in order to determine if a response to the initiator for asynchronous balanced mode is received by the local LAPB device 62 at the communication port 64 and a time limit is expired. It will be appreciated by the skilled addressee that a predetermined amount of time is allocated by the processing unit 66 for detecting the response to the initiator for asynchronous balanced mode. It will be appreciated that the amount of time required is variable but typically about 30 seconds, depending on configuration parameters. In the case where no response to the initiator for asynchronous balanced mode is received by the local LAPB device 62 and the local LAPB device configuration apparatus 8 and the amount of time is expired, the local LAPB device configuration apparatus 8 moves in a failure mode, not shown in FIG. 2.

According to step 22, a test is performed on the received frame. As shown in FIG. 2, the received frame may be one of a received initiator for asynchronous balanced mode and a response to an initiator for asynchronous balanced mode. More precisely, the test is performed in order to find out if the received frame is indicative of a data computing equipment transmitter or if the received frame is indicative of a data terminal equipment transmitter. The received frame is received by the communication port 64 and provided to the processing unit 66 of the local LAPB device configuration apparatus 8.

In the case where the frame is indicative of a data computing equipment transmitter and according to step 26, the local LAPB device is configured as a data terminal equipment.

More precisely, the processing unit 66 of the local LAPB device configuration apparatus 8 provides a configuration signal indicative of a data terminal equipment.

In the case where the received frame is indicative of a data terminal equipment transmitter and according to step 24, the local LAPB device is configured as a data computing equipment.

More precisely, in such case, the processing unit 66 of the local LAPB device configuration apparatus 8 provides a configuration signal indicative of a data computing equipment.

While an embodiment has been disclosed where the local LAPB device configuration apparatus 8 is implemented using hardware, the skilled addressee will appreciate that similar operations may be easily performed using a software implementation. Preferably the software implementation is run after layer 1 startup.

Figure 3:
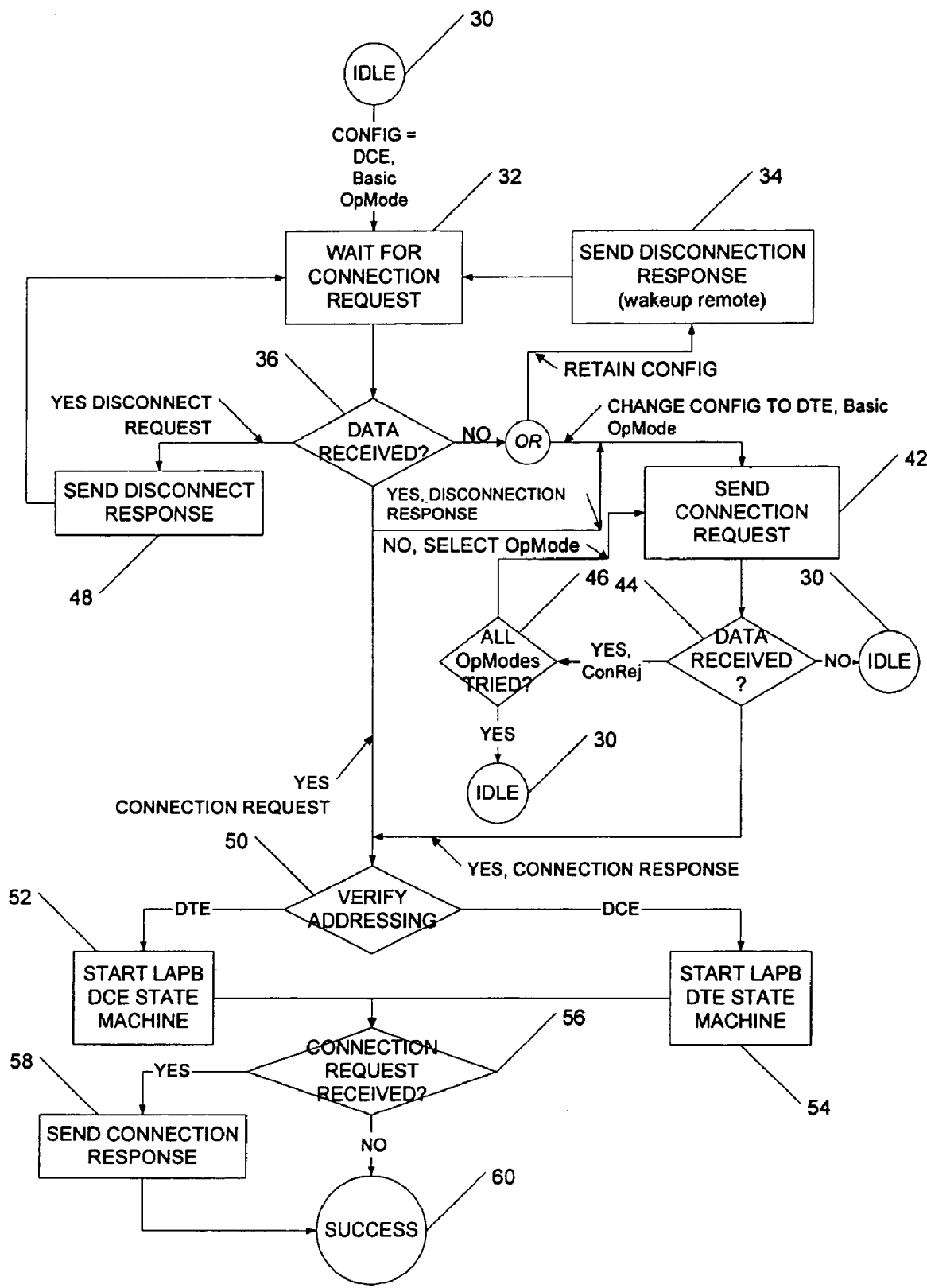
FIG. 3 is a state machine diagram which shows how a local LAPB device is configured.

Now referring to FIG. 3, there is shown a state machine indicating how the local LAPB device configuration apparatus 8 operates.

In state 30, the state machine begins in the idle state. A configuration variable is set to "data computing equipment". Operation mode is set to "basic". It should be understood by those skilled in the art that the layer 2 LAPB auto-configuration state machine will change from the idle state 30 only when the layer 1 software and/or hardware indicates it is ready to send/receive data.

In state 32, the processing unit 66 waits for a connection request which may be one of SABM, SABME and SM.

In state 36, data is received using the communication port 64 from the remote LAPB device 61.

In the case where the data received is indicative of a disconnect request (DISC), a disconnect response (DM), in state 48, is sent to the remote LAPB device 61 by the processing unit 66 via the communication port 64. The state machine returns to the state 32.

Now referring back to the state 36, in the case where no data is received at least one of retain the configuration variable and change the configuration variable to data terminal equipment is performed.

In the case where the configuration variable is retained, the state machine moves to the state 34 where a disconnection response (DM) is sent to the remote LAPB device 61 via the communication port 64. From the state 34, the state machine moves into the state 32.

In the case where the configuration variable is changed to data terminal equipment and the operating mode is changed to basic (modulo-8), the state machine moves into the state 42 in which a connection request is sent to the remote LAPB device 61.

It will be further appreciated that at state 36, a disconnection response may be received from the remote LAPB device 61; in such case, the configuration variable is changed to data terminal equipment, the operating mode is changed to basic (modulo-8) and the state machine moves into the state 42.

In state 42 a send connection request (SABM, SABME, or SM) is sent by the processing unit 66 to the remote LAPB device 61 via the communication port 64. The state machine then moves to state 44.

According to state 44, a test is performed in order to find out if data is received by the communication port 64 from the remote LAPB device 61.

In the case where data is not received the state machine moves into the idle state 30. It is understood by those skilled in the art that the state machine may then optionally restart.

In the case where a connection response indicating a bad operating mode is received (FRMR, or DM) and according to state 46, a test is performed by the processing unit 66 in order to find out if all operating modes have been tried yet.

In the case where all operating modes have been tried, the state machine moves into the idle state 30. It is understood by those skilled in the art that the state machine may then optionally restart.

In the case where not all operating modes have been tried, an operating mode is selected and the state machine moves into the state 42.

Now referring back to the state 36 where a test is performed in order to find out if data is received.

In the case where the data received comprises a connection request (SABM, SABME, SM), a test is performed in state 50, in order to find out if the connection request comprises an indication of a data computing equipment or an indication of a data terminal equipment.

In the case where the connection request comprises an indication of a data computing equipment, the local LAPB device 62 is configured as a data terminal equipment by the processing unit 66 using the configuration signal. Furthermore, a LAPB data terminal equipment state machine is started at state 54. It will be appreciated that the LAPB data terminal equipment state machine supports active/passive startup, modulo-8, modulo-128 and modulo-32768 operation modes.

In the case where the connection request comprises an indication of a data terminal equipment, the local LAPB device 62 is configured as a data computing equipment by the processing unit 66 using the configuration signal. A LAPB data computing equipment state machine is started at state 52. Similarly, the LAPB data computing equipment state machine supports active/passive startup, modulo-8, modulo-128 and modulo-32768 operation modes.

In state 56, a test is performed in order to find out if, following the states 52 and 54, a connection request was received by the processing unit 66 from the remote LAPB device 61 via the communication port 64.

In the case where a connection request was received from the remote LAPB device 61, a connection response is provided, state 58, to the remote LAPB device 61 by the processing unit 66 via the communication port 64. The state machine then moves into a success state 60 where the local LAPB device 62 is now fully configured.

In the case where a connection response was received from the remote LAPB device 61, the state machine moves into the success state 60.

It should be further understood by those skilled in the art that the state machine presented in FIG. 3 may be either implemented as shown or as an enhancement of the normal DTE/DCE state machine used by LAPB implementations.

The embodiments of the invention described above are intended to be exemplary only. The scope of the invention is therefore intended to be limited solely by the scope of the appended claims.

I claim:

1. A method of establishing operation of a local Link Access Protocol Balanced (LAPB) device operable as a data computing equipment device or a data terminal equipment device, the method comprising:

receiving an initiator frame for an asynchronous balanced mode of operation directed to said local LAPB device from a remote LAPB device;

determining, based upon information contained within said received initiator frame, whether said remote LAPB device is operating as a data computing equipment device or a data terminal equipment device;

if it is determined that said received frame information indicates that said remote LAPB device is operating as a data terminal equipment device, initiating operation of said local LAPB device as a data computing equipment device; and if it is determined that said received frame information indicates that said remote LAPB device is operating as a data computing equipment device, initiating operation of said local LAPB device as a data terminal equipment device.

2. The method as claimed in claim 1, further comprising monitoring to detect receipt of said initiator frame from said remote LAPB device and if no initiator frame is detected for a given first time period, providing an initiator frame to said remote LAPB device.

3. The method as claimed in claim 2, wherein said monitoring to detect said initiator frame from said remote LAPB device is performed during a given period of time.

4. The method as claimed in claim 3, further comprising providing said given period of time.

5. The method as claimed in claim 1, wherein said initiator frame is an LAPB supervisory frame.

6. The method as claimed in claim 5, wherein said LAPB supervisory frame is one of:

an LAPB SABM supervisory frame in basic mode frame format;

an LAPB SABME supervisory frame in extended mode frame format; and an LAPB SM supervisory frame in super mode frame format.

7. The method as claimed in claim 1, wherein said initiator frame is one of:

an LAPB DISC supervisory frame;

an LAPB DM supervisory frame; and an LAPB FRMR frame.

8. An apparatus for establishing operation of a local Link Access Protocol Balanced (LAPB) device operable as a data computing equipment device or a data terminal equipment device, the apparatus comprising:

a communication port for receiving an initiator frame for an asynchronous balanced mode of operation originated from a remote LAPB device and directed to said local LAPB device;

a memory for storing data identifying at least one of a data computing equipment device and a data terminal equipment device;

a processing unit coupled to said communication port and said memory for determining whether information contained within said received initiator frame is indicative of said remote LAPB device operating as one of a data computing equipment device and a data terminal equipment device using said data stored in said memory and providing a configuration signal to said local LAPB device as a function thereof; and said configuration signal for initiating operation of said local LAPB device as a data computing equipment device in the case where the received frame information is indicative of said remote LAPB device operating as a data terminal equipment device and further said configuration signal for initiating operation of said local LAPB device as a data terminal equipment device in the case where the received frame information is indicative of said remote LAPB device operating as a data computing equipment device.

9. The apparatus as claimed in claim 8, wherein said communication port provides an initiator frame to said remote LAPB device in the case where no initiator frame is received from said remote LAPB device for a given period of time.

10. The apparatus as claimed in claim 9, wherein said apparatus includes said local LAPB device.

11. The apparatus as claimed in claim 8, wherein said apparatus includes said local LAPB device.

12. A method of establishing operation of a first Link Access Protocol Balanced (LAPB) device coupled to a second LAPB device in a network, said first LAPB device operable as a data terminal equipment device or a data computing equipment device, the method comprising:

receiving a first initiator frame for an asynchronous balanced mode of operation from the second LAPB device directed to the first LAPB device;

evaluating information contained within the received first initiator frame to determine if the second device is operating as a data terminal equipment device or a data computing equipment device;

if it is determined that the second LAPB device is operating as a data terminal equipment device, initiating operation of the first LAPB device as a data computing equipment device; and if it is determined that the second LAPB device is operating as a data computing equipment device, initiating operation of the first LAPB device as a data terminal equipment device.

13. The method of claim 12, further comprising:

determining whether the first initiator frame is received from the second LAPB device prior to expiration of a first predetermined time period; and if the first initiator frame is not received prior to expiration of the first predetermined time period, sending a second initiator frame to the second LAPB device.

14. The method of claim 13, further comprising:

determining whether a third initiator frame is received from the second device in response to the second initiator frame prior to expiration of a second predetermined time period; and if the third initiator frame is not received prior to expiration of the second predetermined time period, setting a failure status condition.

15. The method of claim 13, wherein each of the first and second initiator frames is an initiator frame for a first mode of LAPB operation.

* * * * *

UNITED STATES PATENT AND TRADEMARK OFFICE
CERTIFICATE OF CORRECTION

| | | |
|---|---|---|
| PATENT NO. | : 7,643,433 B2 | Page 1 of 1 |
| APPLICATION NO. | : 10/788479 | |
| DATED | : January 5, 2010 | |
| INVENTOR(S) | : Gordon Rouleau | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1326 days.

Signed and Sealed this

Sixteenth Day of November, 2010

David J. Kappos
*Director of the United States Patent and Trademark Office*